(12) United States Patent
Davis et al.

(10) Patent No.: US 7,984,107 B2
(45) Date of Patent: Jul. 19, 2011

(54) PROXY ASSEMBLY FOR SIMULATING REAL ASSEMBLY FEATURES ON A REMOTE DEVICE

(75) Inventors: Joseph Michael Davis, Issaquah, WA (US); Mikhail Arkhipov, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 912 days.

(21) Appl. No.: 11/223,532

(22) Filed: Sep. 9, 2005

(65) Prior Publication Data

US 2007/0061479 A1    Mar. 15, 2007

(51) Int. Cl.
| | |
|---|---|
| *G06F 15/16* | (2006.01) |
| *G06F 15/167* | (2006.01) |
| *G06F 3/00* | (2006.01) |
| *G06F 9/44* | (2006.01) |
| *G06F 9/46* | (2006.01) |
| *G06F 13/00* | (2006.01) |

(52) U.S. Cl. ......... 709/213; 719/330; 709/203; 709/217
(58) Field of Classification Search .................. 709/213, 709/203
See application file for complete search history.

(56) References Cited

U.S. PATENT DOCUMENTS

| | | | | |
|---|---|---|---|---|
| 6,038,395 | A | 3/2000 | Chow et al. ................... 395/702 |
| 6,157,960 | A * | 12/2000 | Kaminsky et al. ............ 719/315 |
| 6,226,637 | B1 | 5/2001 | Carey et al. ........................ 707/4 |
| 6,324,543 | B1 * | 11/2001 | Cohen et al. ................... 707/200 |
| 6,356,955 | B1 | 3/2002 | Hollberg et al. ............... 709/315 |
| 6,385,661 | B1 | 5/2002 | Guthrie et al. ................. 719/316 |
| 6,385,667 | B1 | 5/2002 | Estakhri et al. .................... 710/8 |
| 6,385,769 | B1 | 5/2002 | Lewallen ........................ 717/125 |
| 6,633,888 | B1 | 10/2003 | Kobayashi ..................... 707/103 |
| 6,816,880 | B1 | 11/2004 | Standberg et al. ............. 709/202 |
| 6,944,851 | B1 * | 9/2005 | Dixon, III et al. ............. 717/108 |
| 2001/0052012 | A1 * | 12/2001 | Rinne et al. .................... 709/224 |
| 2002/0037035 | A1 * | 3/2002 | Singh ............................. 375/240 |
| 2002/0120793 | A1 * | 8/2002 | Guthrie et al. ................. 709/330 |
| 2002/0129064 | A1 | 9/2002 | Guthrie ......................... 707/513 |
| 2002/0169852 | A1 | 11/2002 | Schaeck ........................ 709/218 |
| 2003/0101438 | A1 * | 5/2003 | Mishra et al. ................. 717/136 |
| 2003/0167358 | A1 | 9/2003 | Marvin et al. ................. 709/328 |
| 2003/0182460 | A1 * | 9/2003 | Khare ............................ 709/310 |

(Continued)

FOREIGN PATENT DOCUMENTS

EP     1420340 A1 *   5/2004

OTHER PUBLICATIONS

Chappell, D., Understanding .NET: A Tutorial and Analysis, Jan. 31, 2002, Addison Wesley Professional, chapter entitled "The Common Language Run-time".*

(Continued)

*Primary Examiner* — Ian N Moore
*Assistant Examiner* — Jenee Williams
(74) *Attorney, Agent, or Firm* — Merchant & Gould (57) ABSTRACT

A proxy service for simulating real assembly features on a remote device is described. A data stream including reflection data of a real assembly is generated. The reflection data stream may include data associated with proxy types without including the code from the real assembly. A client obtains the reflection data stream. The reflection data stream facilitates the generation of a proxy assembly on the client and allows the client to instantiate features of the real assembly on the client without the code for the real assembly.

20 Claims, 7 Drawing Sheets

U.S. PATENT DOCUMENTS

| | | | | |
|---|---|---|---|---|
| 2004/0039964 | A1* | 2/2004 | Russell et al. | 714/25 |
| 2004/0221017 | A1* | 11/2004 | Yoon | 709/217 |
| 2004/0255268 | A1* | 12/2004 | Meijer et al. | 717/106 |
| 2005/0050548 | A1* | 3/2005 | Sheinis et al. | 719/311 |
| 2005/0071421 | A1 | 3/2005 | Calo et al. | 709/203 |
| 2005/0108627 | A1* | 5/2005 | Mireku | 715/513 |
| 2005/0138634 | A1* | 6/2005 | Luty et al. | 709/213 |
| 2005/0229189 | A1* | 10/2005 | McManus | 719/330 |
| 2006/0059471 | A1* | 3/2006 | Prokopenko | 717/130 |
| 2006/0064425 | A1* | 3/2006 | Kakivaya et al. | 707/100 |
| 2006/0143597 | A1* | 6/2006 | Alaluf et al. | 717/136 |

OTHER PUBLICATIONS

Richmond et al., Reflections on Remote Reflection, 2001, ACM International Conference Proceedings Series, Proceedings of the 24th Australasian conference on Computer science, vol. 11, pp. 163-170.*

Titus et al, "Pro .NET Remoting, Reflection and Threading", May 16, 2005, Apress Publishing.*

Microsoft Support, "How to: Create amd Use Meta Data Assembly", Apr. 22, 2004, Revision 3.4, article publication Q323491.*

Roman Kiss, The Code Project, "Using the Web Service Callbacks in the .Net Application", Nov. 2, 2001.*

Carl Ganz, Jr.; "Database Developer Corner: Calling .NET Assemblies and Web Services from VB6"; Jul. 2004; pp. 1-4; http://msdn.microsoft.com/library/en-us/dnhcvb04/html/vb04g9.asp?frame=true.

Keith Pijanowski; "Integrating Web Services and COM Components"; May 2004; pp. 1-16; http://msdn.microsoft.com/library/en-us/dnwebsrv/html/intwebsvccom.asp?frame=true.

G. Andrew Duthie; New Code Compilation Features in ASP.NET Whidbey; pp. 1-13; Oct. 2003; http://msdn.microsoft.com/library/en-us/dnvs05/html/codecompilation.asp?frame=true.

Arnout, K. et al.; "*The .NET Contract Wizard: adding Design by Contract to languages other than Eiffel*"; Technology of Object-Oriented Languages and Systems, 2001; Tools 39. 39th International Conference and Exhibition; Jul. 29, 2001-Aug. 3, 2001.

Volgyesi, P. et al.; "*Component-based development of networked embedded applications*"; 28th Euromicro Conference; Sep. 2002.

* cited by examiner

PROXY ASSEMBLY FOR SIMULATING REAL ASSEMBLY FEATURES ON A REMOTE DEVICE

BACKGROUND

Many software applications include units of code packaged into files. These units of code may be referred to as assemblies. In some situations, codes for actual assemblies are installed on a server. Access to the real assemblies is typically restricted for security reasons, and therefore, direct access to the real assemblies does not exist. In such situations, remote programs and applications cannot make use of the real assemblies.

In other situations, real assemblies cannot be copied over from the server because they are only licensed for server installation. Also, the server may provide a unique context that cannot be replicated on the remote device. Therefore, the remote device does not have access to and cannot use real assemblies. Furthermore, in some situations the server may be running different or incompatible versions of the operating system and real assemblies may be incompatible with the remote device environment.

SUMMARY

This Summary is provided to introduce a selection of concepts in a simplified form that are further described below in the Detailed Description. This Summary is not intended to identify key features or essential features of the claimed subject matter. Also, this Summary is not intended for use as an aid in determining the scope of the claimed subject matter.

Generally, aspects of the disclosure relate to a proxy assembly for simulating real assembly features on a remote device. As a succinct summation of a few functional aspects of some embodiments of the present disclosure, a data stream including reflection data of a real assembly is generated. In one aspect, reflection data may include a description of the controls of an assembly. The reflection data stream may include data associated with proxy types without including the code for the real assembly. The proxy types may include type data, property data, sub-property data and/or attribute data that is associated with the reflection data stream. In one aspect, a client obtains the reflection data stream from a server. The reflection data stream may facilitate the generation of a proxy assembly on the client and allow the client to simulate features of the real assembly on the client without the code for the real assembly.

Such a proxy assembly provides dynamic functionality for a client computer without requiring the real assembly to be installed on the client. In this manner, aspects of the proxy assembly may circumvent licensing issues where the real assemblies are licensed to be installed on the server.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Illustrative Embodiments of a Proxy Assembly for Simulating Real Assembly Features on a Remote Device Embodiments of the disclosure relate to a proxy assembly for simulating real assembly features on a remote device. As a succinct summation of a few aspects of the disclosure, a data stream including reflection data of a real assembly is generated. The reflection data stream may include data associated with proxy types without including the code from the real assembly. The proxy types may include type data, property data, sub-property data and/or attribute data that is associated with the reflection data stream. In one aspect, a client obtains the reflection data stream from a server. The reflection data stream may facilitate the generation of a proxy assembly on the client and allow the client to simulate features of the real assembly on the client without the code for the real assembly.

Figure 3:
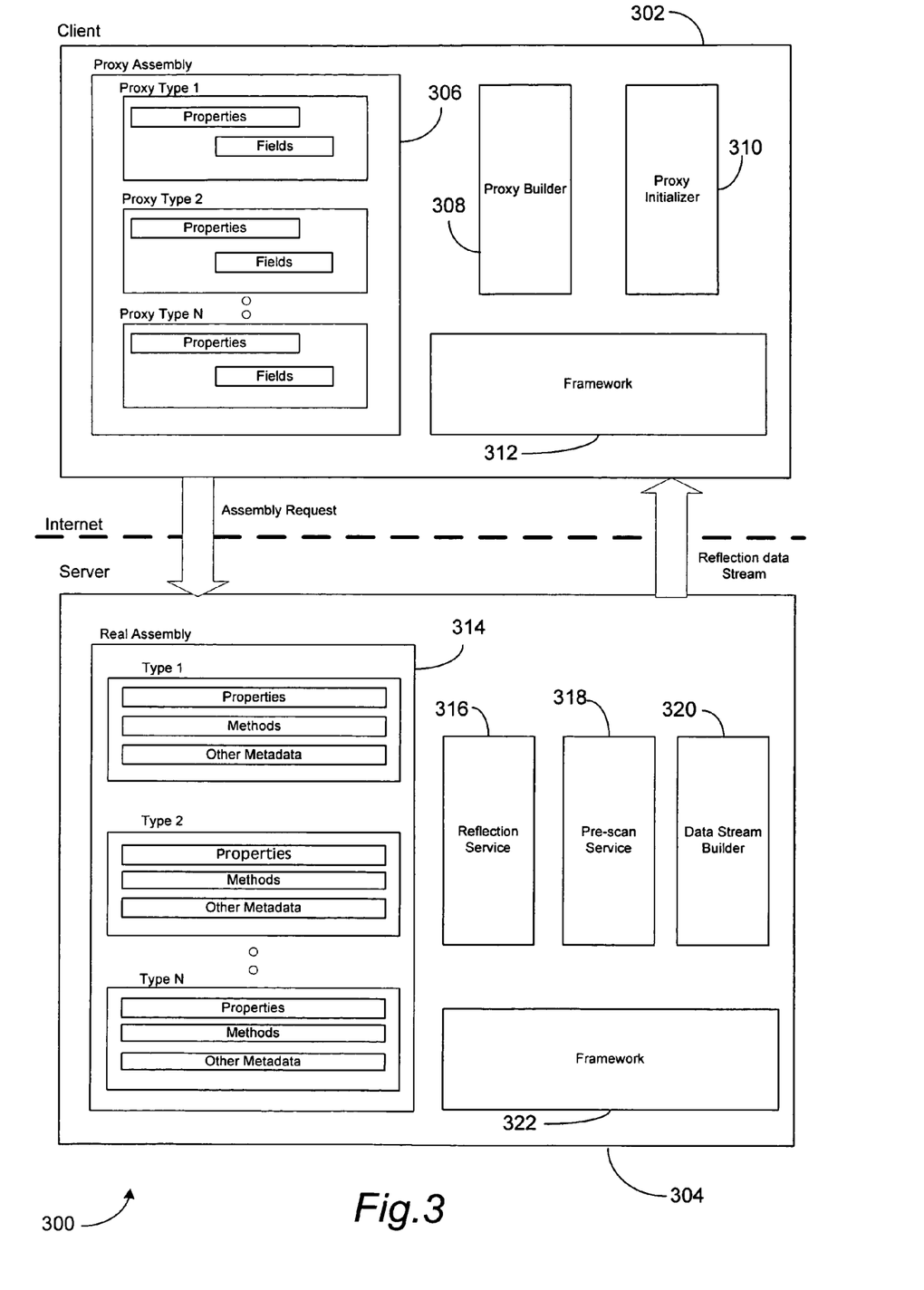
FIG. 3 represents one exemplary system overview for generating a proxy assembly.

FIG. 3 represents one exemplary system overview 300 for generating a proxy assembly. Client 302 and server 304 represent a general modular overview of some aspects of the disclosure. Client 302 and server 304 may include the same modular elements being represented during different processes. Client 302 and server 304 may be integrated as a combination of software and hardware elements, an operating system or any combination thereof. Hardware, databases, software or applications referenced herein may be integrated as a single element or include various elements in communication with one another.

Software and/or hardware elements are depicted herein for explanatory purposes only and not for limiting the configuration to multiple elements or a single element performing several functions. Elements of client 302 may "live on" a single computing device or a plurality of computing devices in communication with one another. Likewise, elements of server 304 may "live on" a single server or a plurality of servers in communication with one another. Aspects of client 302 and server 304 may include computing device 100 as exemplified in FIG. 1 and/or mobile computing device 200 as exemplified in FIG. 2. In one aspect, server 304 may be represented by aspects of MICROSOFT SHAREPOINT from MICROSOFT CORPORATION, headquartered in Redmond, Wash.

In FIG. 3, client 302 may include proxy assembly 306, proxy builder 308, proxy initializer 310, and framework 312. Reference numbers 306-312 may include separate programs, separate databases, separate computing devices and separate hardware. Reference numbers 306-312 may also include multiple programs, databases, computing devices, hardware or any combination thereof. Server 304 may include real assembly 314, reflection service 316, pre-scan service 318, data stream builder 320 and framework 322. Reference numbers 314-322 may include separate programs, separate databases, separate computing devices and separate hardware. Reference numbers 314-322 may also include multiple programs, databases, computing devices, hardware or any combination thereof. Moreover, even though eXtensible Markup Language ("XML") is referenced herein, any type of data stream conducive to network communication may be implemented. XML is referenced herein as one example of the plurality of various network communication languages that may be implemented. In one aspect, the XML data stream is encrypted for security. Any type of data stream may be implemented as is more fully set forth herein.

In FIG. 3, client 302 may be associated with framework 312 and server 304 may be associated with framework 322. Framework 312 and 322 may include a set of applications, a set of development tools for building applications, web applications and/or XML programming services. Aspects may include a platform that provides development tools to allow programmers to write code using a plurality of different program languages. In one embodiment, framework 312 and 322 may be represented by aspects of MICROSOFT .NET platform from MICROSOFT CORPORATION, headquartered in Redmond, Wash. Framework 312 and 322 may include any type of framework for performing operations on an operating system. In one aspect, framework 312 and 322 include some of the same applicants, programs and methods so that operations performed on framework 322 may be replicated on framework 312 or vice versa.

Server 304 may also include real assembly 314. Real assembly 314 may include the code of a program, application or routine that is installed on server 304. Real assembly 314 may include one or more types. The types may include one or more usable portions of real assembly 314 that performs a function. The types of real assembly 314 may also include properties, methods, fields, events, and other metadata. The types of real assembly 314 may include attributes associated with the types, attributes associated with the properties, sub-properties of properties, and/or values. In one aspect, real assembly 314 includes aspects of object-oriented programming.

Server 304 may include reflection service 316. Reflection service 316 may include code associated with real assembly 314, or reflection service 316 may include a separate program for performing reflection operations. Succinctly stated, reflection service 316 includes determining "data about data." For example, in FIG. 3, reflection service 316 may determine that real assembly 314 includes several types. With regard to type one, reflection service 316 may determine that type one includes certain properties, fields, events, methods, metadata, values, attributes, sub-properties or any other data associated with the code for real assembly 314. In one aspect, reflection service 316 does not copy any of the code associated with real assembly 314. The "data about data" associated with real assembly 314 may be utilized, as more fully set forth below, to facilitate a proxy assembly.

Pre-scan service 318 may include a service for scanning data associated with reflection service 316 to optimize the data. Pre-scan service 318 may identify some repeated property data so that the repeated property data is written once. Pre-scan service 318 may also identify framework properties. In this manner, properties that are available to the client may not need to be written in that the property data can be obtained from the client. Pre-scan service 318 may also identify recursive properties. Recursive properties may include properties that reference one another and cause a recursion in a data stream. In such a situation, pre-scan service 318 may identify the recursion so that operations may be performed for resolution. Pre-scan service 318 may include any type of scanning service for optimizing data for a data stream.

Server 304 may further include data stream builder 320. Even though data stream builder 320 is depicted in FIG. 3 as a separate module, data stream builder 320 may be associated with various operations of server 304. For example, data stream builder 320 may include operations for building a data stream during a reflection operation, a pre-scan operation and/or any other operation performed in association with an assembly request. Succinctly stated, aspects of data stream builder 320 include building a data stream from data associated with reflection service 316 and pre-scan service 318. The data stream may include an XML data stream, an XML data stream with a reference list, and/or any other type of data stream sufficient for communication between two devices.

Client 302 may include proxy assembly 306. As a general analogy, proxy assembly 306 may be analogized to a "shell" of real assembly 314. Proxy assembly 306 may include proxy types, properties, fields, values and attributes associated with real assembly 314 without requiring the code of real assembly 314. In one aspect, the proxy types, properties, attributes, fields and values associated with the fields are instantiated from the received reflection data stream and framework 312. The proxy types may also be associated client methods that provide some functionality to proxy assembly 306. Proxy assembly 306 may be associated with a program, application and/or routine to provide real assembly features without requiring the code of the real assembly.

Client 302 may include proxy builder 308. Proxy builder 308 may include an assembly context module, a referenced context module, a class context module, a property context module, and/or an attributes context module. Succinctly stated, depending on the received reflection data stream, proxy builder 308 may pass the data stream to the appropriate module for building the proxy assembly from the received reflection data stream. In one aspect, proxy builder 308 may include a program for generating a proxy assembly from an XML data stream that includes reflection data. For example, an assembly context module may receive a reflection data stream. The reflection data stream may be passed to a reference context module to determine data associated with a reference table. Types may be passed to a class context module and properties may be passed to a property context module for determining data associated with the same. The property context module may also determine sub-properties associated with the reflection data stream. When attributes are associated with the reflection data stream, the data stream may be passed to an attributes context module for determining the same. In one aspect, proxy builder 308 is associated with framework 312. In another aspect, proxy builder 308 is a module of framework 312. In still another aspect, proxy builder 308 includes any type of builder for facilitating the generation of a proxy assembly from a received reflection data stream.

Client 302 may further include proxy initializer 310. Even though proxy initializer 31 is depicted as a separate module, proxy initializer 310 may include an initialize method associated with proxy assembly 306. In one aspect, proxy initializer 310 interprets the reflection data stream and extracts associated values therefrom. Proxy assembly instantiates an initialize method to associate the values with variables of the proxy types. Proxy initializer 310 may include storing data associated with the types that are created by proxy builder 308. The stored data may be utilized to build or retrieve methods for initialization of the types. In one aspect, proxy initializer 310 assigns values to the fields of proxy assembly 306. For properties that are associated with framework 312 and that can be serialized and transferred between client 302 and server 304, the properties may be assigned their respective values. For complex properties based on supporting types, methods associated with the supporting types may be stored until called. Nested properties may involve initializing data associated with one property and storing data associated with a mid-level property. Regarding property references, some references may be stored as local variables and reloaded to initialize other fields or fill in arguments to methods. A database may be maintained to record which local variables contain such references for reloading. In other aspects, proxy initializer 310 may include any type of initializer for initializing a proxy assembly.

In general and as is more fully set forth below, client 302 sends an assembly request to server 304. In response, server 304 performs reflection on real assembly 314 to determine relevant proxy data associated with the real assembly. The relevant proxy data is pre-scanned to optimize a generated data stream. A data stream is built to include the aspects of the reflection data. A reflection data stream is sent to client 302. Client 302 builds and initializes a proxy assembly from the received reflection data stream. In some aspects, some elements of a reflection data stream may include aspects of the structure as follows:

```
<Assembly Name='[Full Assembly Name]'>
  <Ref Name='[Full Assembly Name]'>
    <Class Name='[Full Class Name]' ID='[Document-unique
      class ID]'/>
    <Class ... />
  </Ref>
  <Ref ... />
  <Class Name='[Full Class Name]' ID='[Document-unique class ID]'>
    <Attr Type='[Attribute type ID]'>
      <Param Type='[Constructor argument class ID]'
      Text|Serial='Argument value' />
      <Param ... />
    </Attr>
    <Attr ... />
    <Prop Name='[Property name]'
      Type='[property's class ID]'
      Convert='[type converter's class ID]'
      Flags='[Property flags]'>
      <Attr ... />
    </Prop>
    <Prop ... />
  </Class>
  <Class Name='[Full Class Name]'
    ID='[Document-unique class ID]'
    Base='[Interesting base class ID]'>
    <Attr ... />
    <Prop Name='[Property name]'
```

-continued

```
      ID='[Class-unique reference ID]'
      Type='[property's class ID]'
      Convert='[type converter's class ID]'
      Flags='[Property flags]'
      Text|Serial|Ref='Default value'>
      <Attr ... />
    </Prop>
    <Prop Name='[Property name]'
      ID='[Class-unique reference ID]'
      Type='[property's class ID]'
      Convert='[type converter's class ID]'
      Flags='[Property flags]'>
      <Prop Name='[Child property name]' Text|Serial|Ref=
      'Default value'/>
      <Prop Name='[Child property name]' Text|Serial|Ref=
      'Default value'>
        <Prop Name='[Child property name]' Text|Serial|Ref=
        'Default value' />
        <Prop ... />
      </Prop>
      <Attr ... />
    </Prop>
  </Class>
  <Class ... />
</Assembly>.
```

Figure 4:
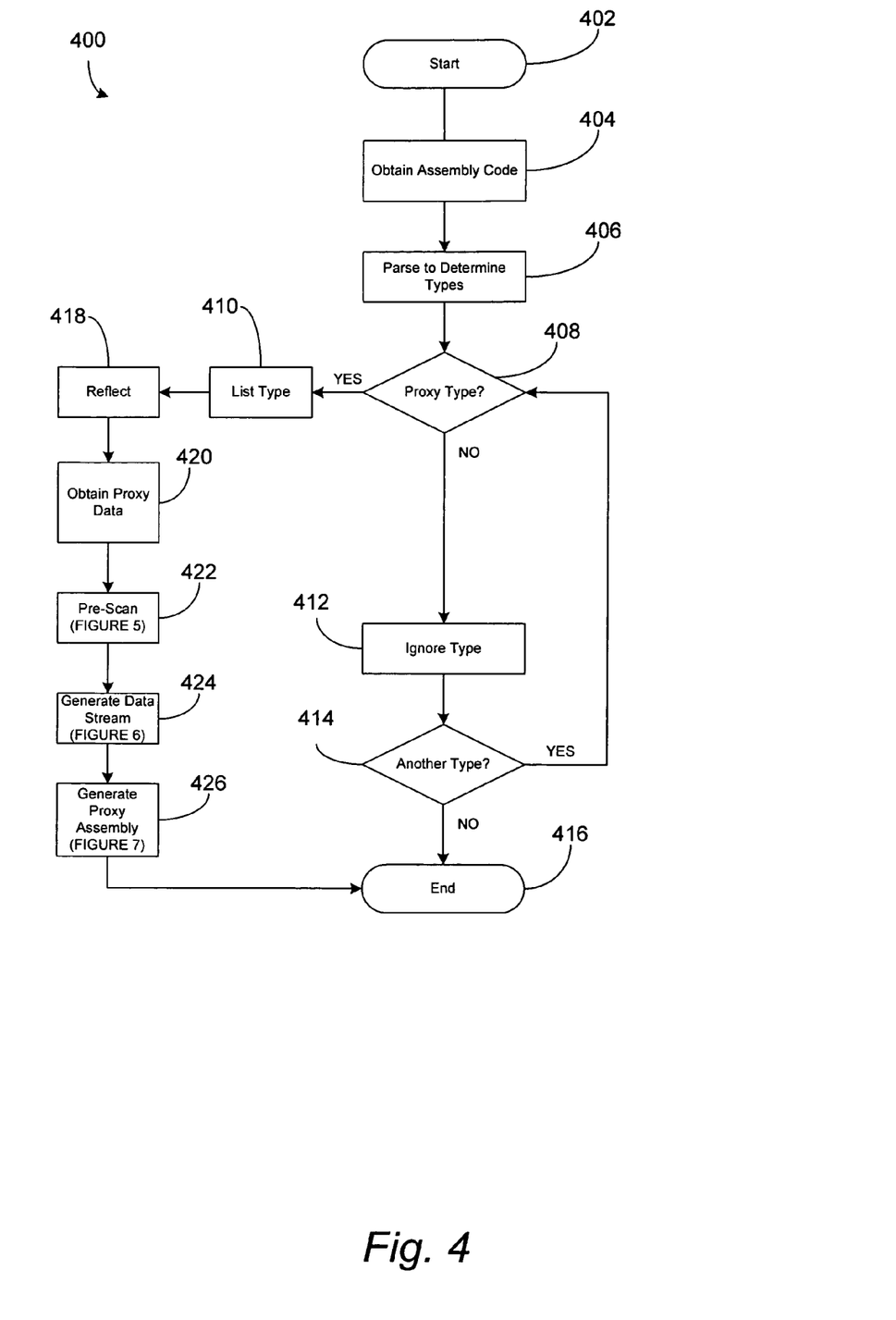
FIG. 4 is an operational flow diagram representing an exemplary embodiment for determining types associated with a real assembly.

FIG. 4 is an operational flow diagram representing an exemplary embodiment for determining types associated with a real assembly for reference in a reflection data stream. Operational flow 400 starts at start operation 402 and flows to operation 404, where the real assembly is obtained. At operation 406, the real assembly is parsed to determine one or more types. A type may include one or more usable portions of the real assembly that perform a function. Operational flow 400 continues to decision operation 408 where it is determined whether the parsed types are proxy types. A proxy type may be identified by a list of proxy types that is associated with the server. Stated another way, proxy type definitions may be hard coded on the server. In another embodiment, proxy type definitions may be sent with an assembly request from the client. In this manner, the client has freedom to determine which types are reflected. When a type is identified as a proxy type, the proxy type is listed as indicated by operation 410.

When a type is not identified as a proxy type, operational flow 400 may flow to operation 412 where the type is ignored. Stated another way, the type is not a type that includes data to facilitate a proxy assembly on a client. Operational flow 400 flows to decision operation 414 where it is determined if another type exists. Where another type exists, operational flow 400 loops back to decision operation 408. Where another type does not exist, operational flow 400 continues to end operation 416. In one aspect, where operational flow 400 does not identify a proxy type or a reference type, end operation 416 may signify that the real assembly does not include elements for proxy.

In another aspect of operational flow 400, when the proxy types are identified, operation 410 may include a list of the same. In one aspect of operation 410, after the types have been considered for proxy status, the types of the properties are recursively checked to assure that they are included on the list of types to proxy. If the type of a property is not included in the list, child properties are considered. Where the property type is on the list, then child properties do not require consideration. The list may be reflected as indicated by operation 418. Succinctly stated, reflection may include determining "data about data." For example, reflection may determine properties, methods, metadata, values, attributes, sub-properties or any other data associated with the list of types. Operational flow 400 continues to operation 420, where proxy data associated with operation 418 is obtained. In one aspect, proxy data includes properties, sub-properties, attributes and/or values associated with the types identified in operation 410. In one aspect, operation 420 does not include method data associated with the types. In another aspect, operation 420 does not include the code associated with the real assembly.

Operational flow 400 continues to operation 422, where the proxy data is pre-scanned. Operation 422 is more fully set forth below in association with FIG. 5. Operational flow 400 continues to operation 424, where a data stream is generated. Operation 424 is more fully described below in association with FIG. 6. Operational flow 400 may also continue to operation 426, where a proxy assembly is generated. Operation 426 is more fully described below in association with FIG. 7. Operational flow 400 continues to end operation 416.

Figure 5:
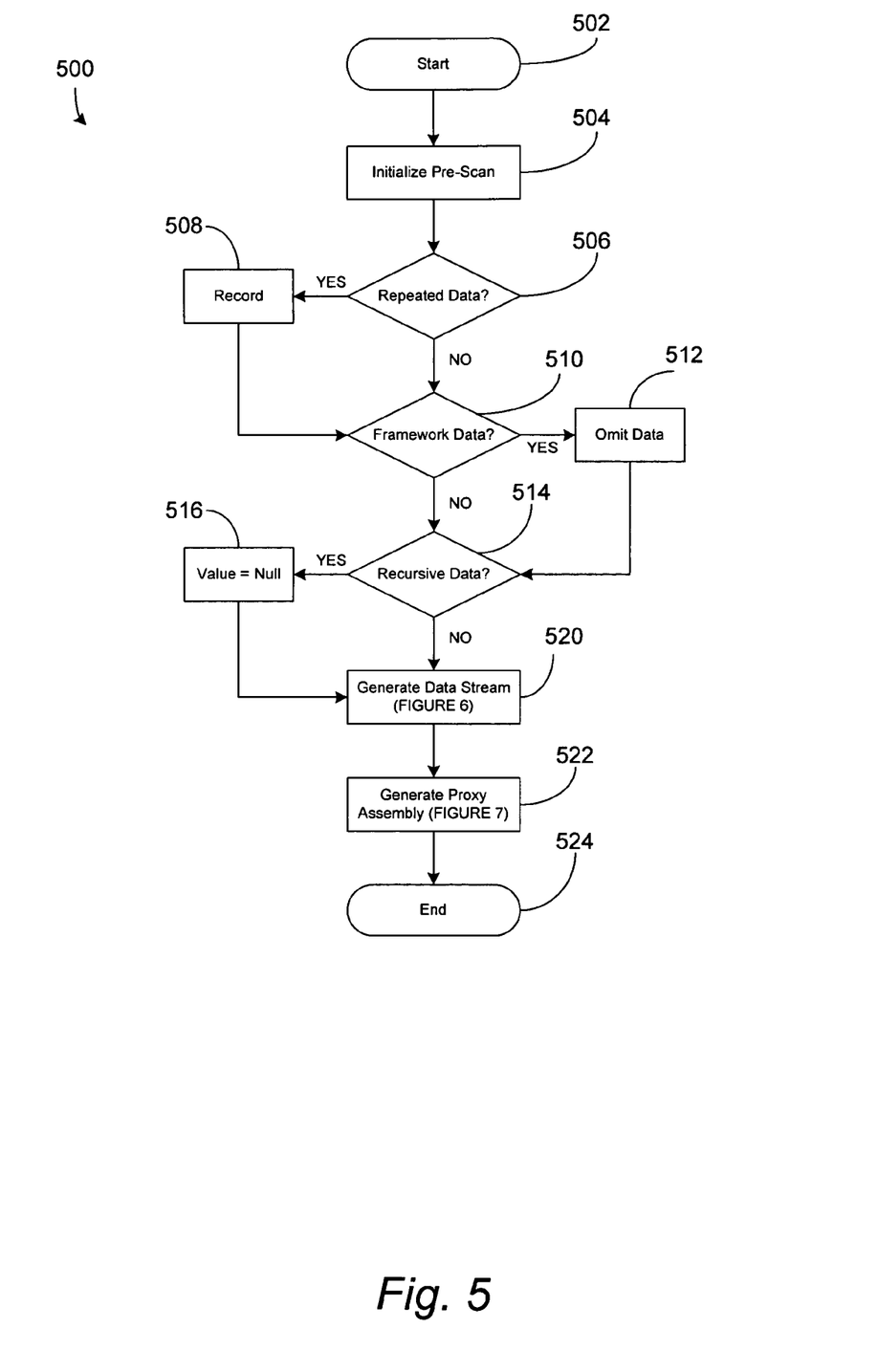
FIG. 5 is an operational flow diagram representing an exemplary embodiment for pre-scanning reflection data.

FIG. 5 is an operational flow diagram representing an exemplary embodiment for pre-scanning reflection data. Operational flow 500 starts at start operation 502 and flows to operation 504, where the pre-scan operation is initialized. In one aspect, the pre-scan operation is initialized after reflection data is generated. A pre-scan operation may be initialized to optimize the writing of data during data stream generation. At decision operation 506, it is determined whether repeated property data exists among the proxy types. Repeated data may include repeated object references. To determine repeated object references, the object references are compared and properties that refer to the same object are recorded as indicated by operation 508. In such a situation, a data stream may be optimized because repeated objects are not written more than once. The repeated objects may be referenced in the data stream. From operation 508, operational flow 500 continues to operation 510 as indicated below.

Decision operation 510 includes determining whether framework data exists among the types. For example, types may include data that is referenced in the framework. In one aspect, the framework may also exist on a client device that is requesting the assembly. In such a situation, framework data may be excluded as indicated in operation 512. In one aspect, initial value data is not omitted during operation 512. In this situation, unnecessary data is not written where it can be obtained on the client device. From operation 512, operational flow 500 continues to operation 514 as indicated below.

Decision operation 514 includes determining whether recursive data exists in the real assembly. Recursive data may include data that references itself and may cause a recursion in a data stream. For example, operational flow 500 may identify instances of recursive data by determining whether a sequence is listed more than twice. In one aspect, the sequence is a sequence of property types maintained in a stack associated with operation 410. The sequence of data between the first and second instance is compared to the sequence of data between the second and third instance. When the sequences match, the data sequences are considered recursive. During the generation of a data stream, the value of such a property may be recorded as null as indicated by operation 516. From operation 516, operational flow 500 continues to operation 520 as indicated below.

Operational flow 500 continues to operation 520, where a data stream is generated. Operation 522 is more fully described below in association with FIG. 6. Operational flow 500 may also continue to operation 522, where a proxy assembly is generated. Operation 522 is more fully described below in association with FIG. 7. Operational flow 500 may then continue to end operation 524.

Figure 6:
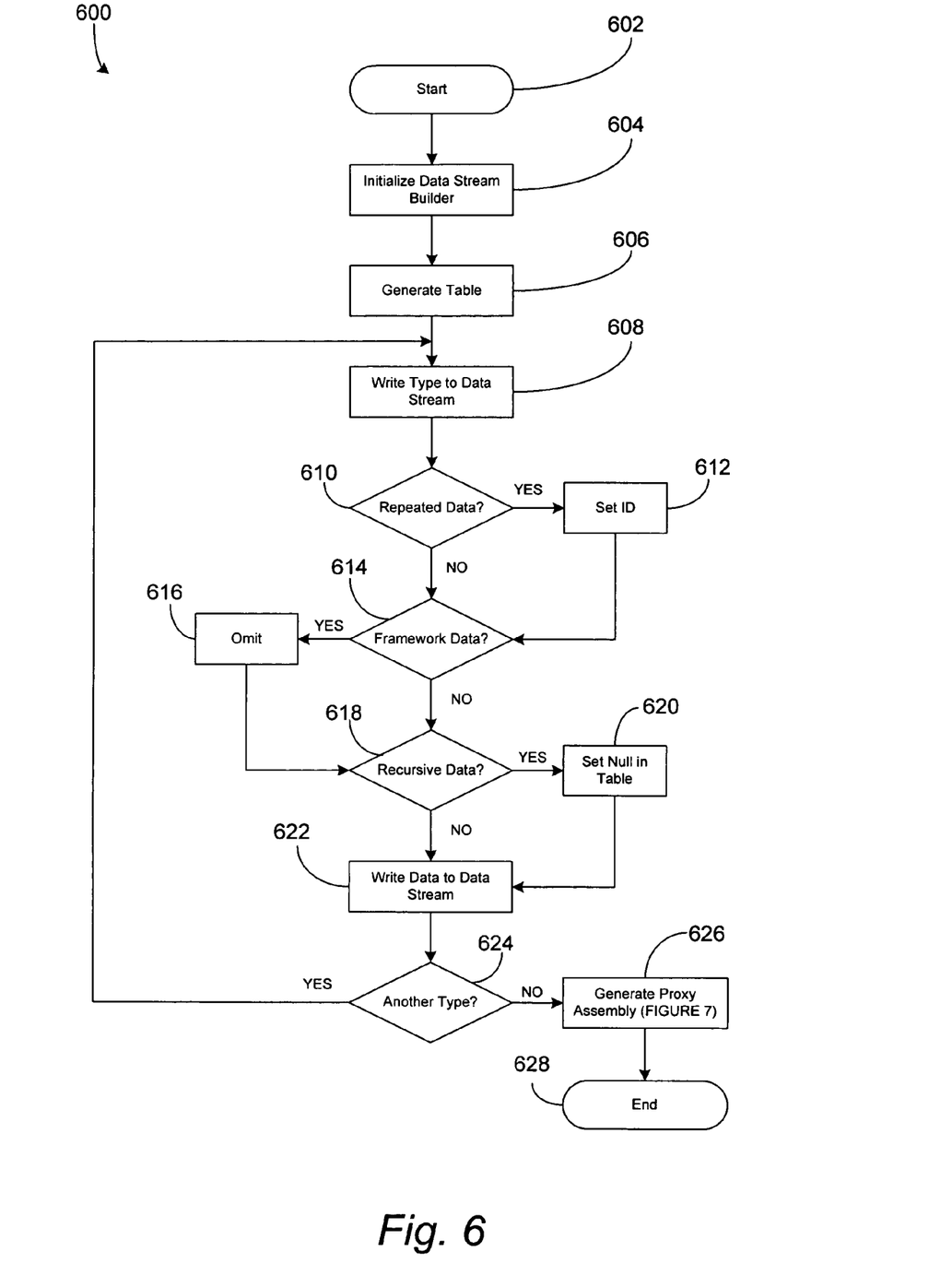
FIG. 6 is an operational flow diagram representing an exemplary embodiment for generating a data stream.

FIG. 6 is an operational flow diagram representing an exemplary embodiment for generating a data stream. In one aspect, the data stream includes an XML data stream. In another aspect, the XML data stream is encrypted for security before the XML data stream is transmitted. However, aspects may include generation of any type of data stream sufficient to convey data between devices. Even though operational flow 600 depicts a separate operational flow apart from operational flow 400 and 500. Operational flow 600 may include operations occurring during any aspect of operational flow 400 and/or operational flow 500. Stated another way, data stream generation may occur piecemeal during operational flow 400 and/or operational flow 500.

Operational flow 600 starts at start operation 602 and flows to operation 604, where the data stream builder is initialized. At operation 606, a data stream table is generated. In one aspect the data stream table is the first set of data in the data stream. The data stream table may include identifiers associated with externally referenced types. Operational flow 600 continues to operation 608 where a type is written to the data stream. At operation 610, it is determined whether the type includes repeated data. Where the type includes repeated data, an identifier may be set as indicated by operation 612. In one aspect, the identifier is set locally. Operational flow 600 continues to operation 614 as indicated below.

At operation 614, it is determined whether the type includes framework data. Where the type includes framework data, the data may be omitted as indicated by operation 616. Operational flow 600 continues to operation 618 as indicated below.

At operation 618, it is determined whether the type includes recursive data. Where the type includes recursive data, a null value may be set to the data stream table as indicated by operation 620. Operational flow 600 continues to operation 622 as indicated below.

At operation 622, data is written to the data stream. Stated another way, data that is not referenced in the data stream table may be written to the data stream. In one aspect, the data is written as an XML data stream. Operational flow 600 continues to decision operation 624 where it is determined whether to write another type. Where it is decided to write another type, operational flow 600 loops back. Where another type does not require writing, operational flow 600 continues to operation 626, where a proxy assembly is generated. Operation 626 is set forth below with respect to FIG. 7. Operational flow 600 continues to end operation 628.

Figure 7:
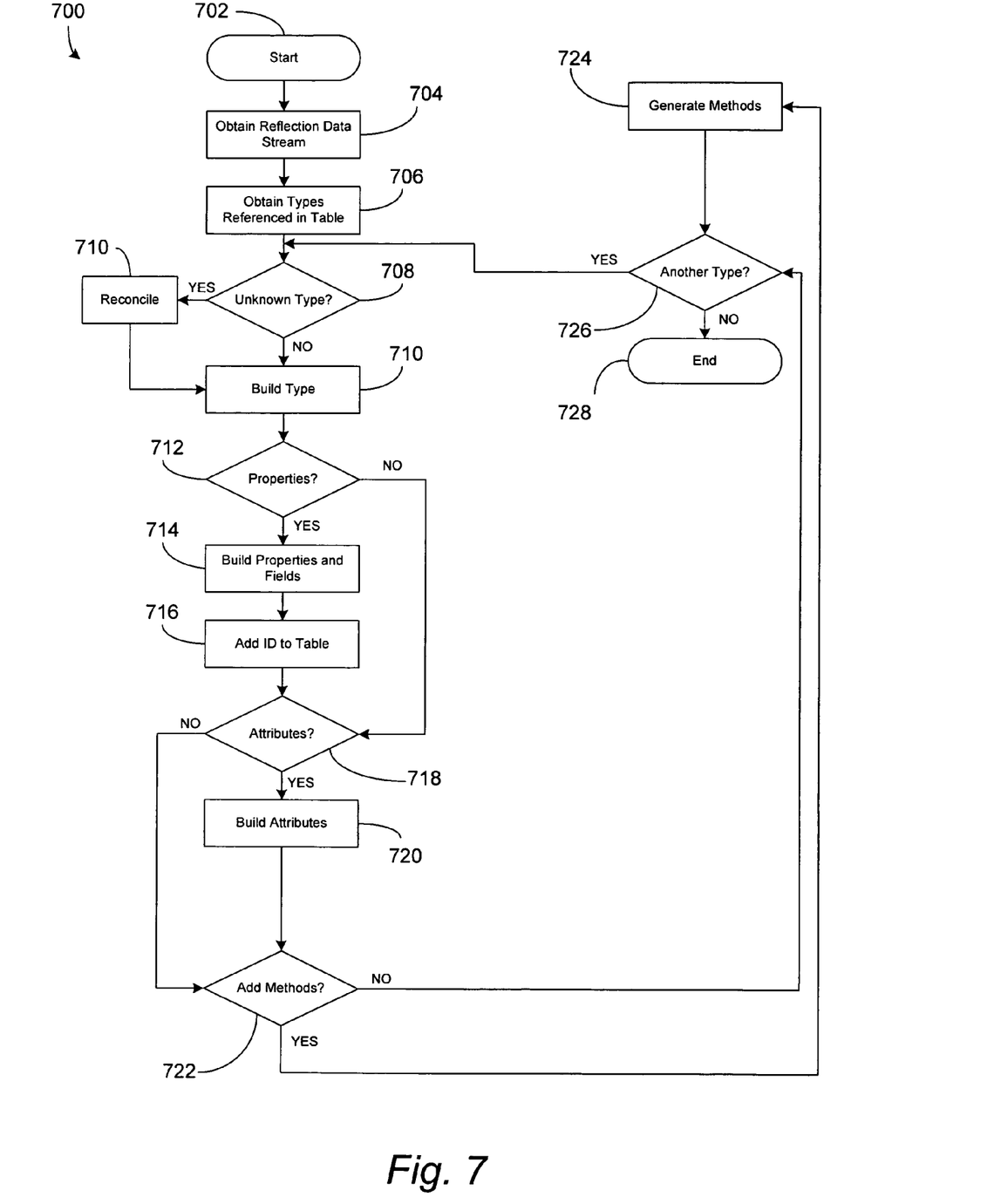
FIG. 7 is an operational flow diagram representing an exemplary embodiment for generating a proxy assembly.

FIG. 7 is an operational flow diagram representing an exemplary embodiment for generating a proxy assembly. In one aspect, operations associated with operational flow 700 are representative of reflection emit functionality associated with the framework of the client. Operational flow 700 begins at start operation 702 and continues to operation 704 where the reflection data stream is obtained. The reflection data stream may be obtained in any manner. For example, the reflection data stream may be obtained from the server, a database and/or an intermediary device. Operational flow 700 continues to operation 706 where the types referenced in the data stream table are obtained. In general, identifications associated with the data stream reference table are matched to a type. Operational flow 700 continues to decision operation 708 where it is determined whether the data stream reference table includes unknown types. For example, a type may be set to null indicating that a type that exists on the server does not exist on the client.

In one aspect, operational flow 700 continues to operation 710 where the unknown type is reconciled. The unknown type may be reconciled at operation 710 or the unknown type may be reconciled at some other point in operational flow 700 such as operation 732. If one of the types does not exist on the client, options may exist. For example, the unknown type may be treated as a string or the unknown type may be ignored. In some cases, a value may be converted to a string to be utilized by a data stream.

Operational flow 700 continues to operation 710 where the type is built. In one aspect, elements of the reflection data stream are sent to a class context module where the type is built. At decision operation 712, it is determined whether property data (and/or sub-property data) exists that is associated with the type. Where property data does not exist, operational flow 700 continues to decision operation 718 as set forth below. Where property data does exist, properties and fields are built as indicated by operation 714. In one aspect, elements of the reflection data stream are sent to a property context module where the properties are built. At operation 716, an identifier is added to a table for reference during an initialization operation.

Operational flow 700 continues to decision operation 718 where it is determined whether attribute data exists that is associated with the type, properties and/or sub-properties. Where attribute data does not exist, operational flow 700 continues to decision operation 724 as more fully set forth below. Where attribute data does exist, attributes are built as indicated by operation 720. In one aspect, elements of the reflection data stream are sent to an attribute context module where the attributes are built.

Operational flow 700 continues to decision operation 722 where it is determined whether to add methods. Where methods are not to be added, operational flow 700 continues to decision operation 726 as more fully set forth below. Where methods are to be added, operational flow 700 continues to operation 724 where the methods are generated. The methods may include get and set methods, initialization methods, and/or any other methods for providing real assembly features.

At decision operation 726, it is determined whether another type exists. When another type exists, operational flow 700 loops back to decision operation 708. Where another type does not exist, operational flow 700 continues to end operation 728. For example, the proxy assembly may be used in conjunction with a web page designer. The web page designer may require type information in the control assembly so it can be displayed in a property grid to allow a user to edit the known properties of the controls. The proxy assembly allows the property grid to support any kind of control, rather than having to build information into the web page designer about a known set of controls. As another example, proxy assemblies may provide features to autocomplete engines such as MICROSOFT INTELLISENSE from MICROSOFT CORPORATION, headquartered in Redmond, Wash. In such an example, proxy assemblies may facilitate the generation of files that drive an autocomplete engine. In another aspect, the proxy assembly may be analogized to a "shell" of a real assembly. The proxy assembly may include proxy types, properties, fields, values and attributes associated with the real assembly without requiring the code of the real assembly. The proxy assembly may be associated with any program, application and/or routine to provide real assembly features without requiring the code of the real assembly.

As is set forth herein a proxy assembly provides dynamic functionality for a client computer without requiring the real assembly to be installed on the client. In this manner, aspects of the proxy assembly may circumvent licensing issues where the real assemblies are licensed to be installed on the server.

Illustrative Operating Environment

Figure 1:
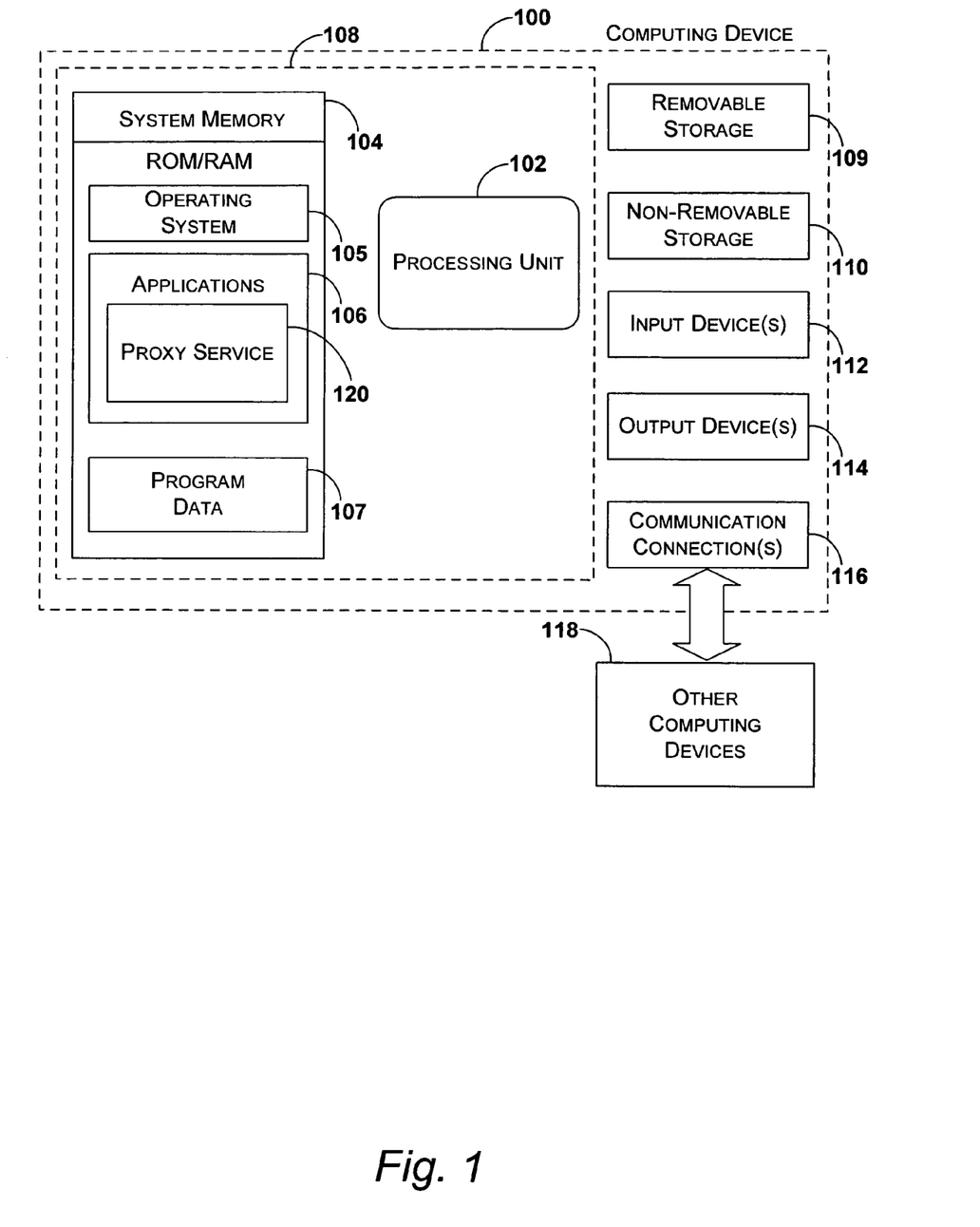
FIG. 1 illustrates an exemplary computing device that may be used in one aspect of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include application 120 for proxy service. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. All these devices are known in the art and need not be discussed at length here.

Computing device 100 also contains communication connection(s) 116 that allow the device to communicate with other computing devices 118, such as over a network or a wireless mesh network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
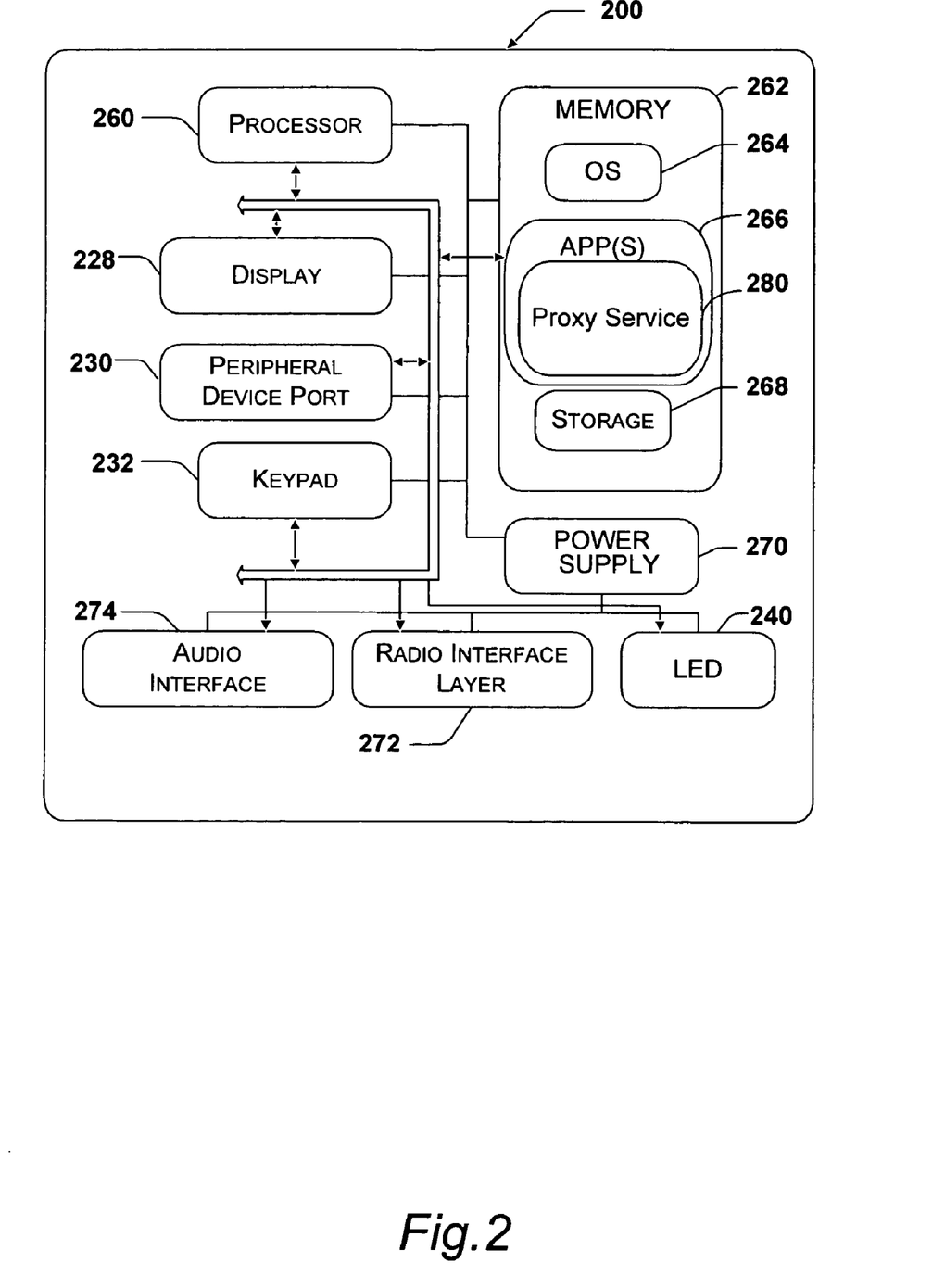
FIG. 2 illustrates an exemplary mobile device that may be used in one aspect of the present invention.

FIG. 2 illustrates a mobile computing device 200 that may be used in one exemplary embodiment of the present invention. With reference to FIG. 2, one exemplary system for implementing the invention includes a mobile computing device, such as mobile computing device 200. The mobile computing device 200 has processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, which is resident in memory 262 and executes on processor 260. Keypad 232 may be a push button numeric dialing pad (such as on a typical telephone), or a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. Mobile computing device 200 also includes non-volatile storage 268 within memory 262. Non-volatile storage 268 may be used to store persistent information which should not be lost if mobile computing device 200 is powered down. Applications 266 may use and store information in storage 268, such as e-mail or other messages used by an e-mail application, contact information used by a PIM, appointment information used by a scheduling program, documents used by a word processing application, and the like. In one embodiment, applications 266 further include application 280 for proxy service.

Mobile computing device 200 has power supply 270, which may be implemented as one or more batteries. Power supply 270 might further include an external power source, such as an AC adapter or a powered docking cradle that supplements or recharges the batteries.

Mobile computing device 200 is shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes radio interface layer 272 that performs the function of transmitting and receiving communications, such as radio frequency communications. Radio interface layer 272 facilitates wireless connectivity between mobile computing device 200 and the outside world, via a communications carrier or service provider. Transmissions to and from radio interface layer 272 are conducted under control of operating system 264. In other words, communications received by radio interface layer 272 may be disseminated to application programs 266 via operating system 264, and vice versa.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for generating a proxy assembly on a client according to metadata of a real assembly located on a server, the computer implemented method comprising:

providing, on the server, a real assembly that includes real assembly code for causing real assembly functionality, wherein the real assembly includes a type identifier that indicates a type of real assembly and a method for causing the real assembly functionality;

parsing, on the server, the real assembly to identify the type identifier;

determining, on the server, that the type identifier is a proxy type by identifying the type identifier in a list of proxy types;

generating, on the server, reflection data related to the real assembly, wherein the reflection data includes any properties related to the real assembly, any attributes related to the real assembly, and any values related to the real assembly, wherein the reflection data does not include the method, wherein the reflection data does not include the real assembly code;

optimizing, on the server, the reflection data, wherein optimizing includes:
recording properties of the reflection data that include a same reference,
excluding references to a framework of the server when framework data exists on the client, and
identifying recursive data by identifying any of the properties of the real assembly listed more than twice within a sequence, wherein a value of any of the properties listed more than twice within the sequence is indicated with a null indicator;

generating, on the server, a data stream for the optimized reflection data, wherein generating the data stream includes writing the type identifier to the data stream, writing an identifier for the properties that include the same reference, omitting framework data, and setting recursive data to null;

receiving, on the client, the data stream;

identifying, on the client, the type identifier of the received data stream; and building, on the client, a proxy assembly having a type identified by the type identifier, wherein any properties of the data stream are built to the type, wherein fields are generated for any properties built to the type, wherein property data is populated to the fields, wherein attributes of the data stream are built to the type, wherein local client methods are added to the type to provide real assembly functionality without the real assembly code.

2. The computer-implemented method of claim 1, wherein generating a data stream further includes generating a data stream table that includes references to the type.

3. The computer-implemented method of claim 2, wherein the type identifier of the received data stream includes generating the data stream table from the data stream and identifying the type from the generated data stream table.

4. The computer-implemented method of claim 1, wherein the data stream is a secured mark-up language data stream.

5. The computer-implemented method of claim 1, wherein building a proxy assembly further comprises identifying the type identifier as an unknown type and reconciling the unknown type prior to building the proxy assembly.

6. The computer-implemented method of claim 1, wherein the local client method is generated on the client.

7. The computer-implemented method of claim 6, wherein the local client method includes at least one member of a group comprising: a set method, a get method, and an initialize method.

8. A computer storage memory having computer executable instructions for generating a proxy assembly according to metadata of a real assembly, the instructions comprising:

providing, on a server, a real assembly that includes real assembly code for causing real assembly functionality, wherein the real assembly includes a type identifier that indicates a type of real assembly and a method for causing the real assembly functionality;

parsing, on the server, the real assembly to identify the type identifier;

determining, on the server, that the type identifier is a proxy type by identifying the type identifier in a list of proxy types;

generating, on the server, reflection data related to the real assembly, wherein the reflection data includes any properties related to the real assembly, any attributes related to the real assembly, and any values related to the real assembly, wherein the reflection data does not include the method, wherein the reflection data does not include the real assembly code;

optimizing, on the server, the reflection data, wherein optimizing includes:
- recording properties of the reflection data that include a same reference,
- excluding references to a framework of the server when framework data exists on a client, and
- identifying recursive data by identifying any of the properties of the real assembly listed more than twice within a sequence, wherein a value of any of the properties listed more than twice within the sequence is indicated with a null indicator;

generating, on the server, a data stream for the optimized reflection data, wherein generating the data stream includes writing the type identifier to the data stream, writing an identifier for the properties that include the same reference, omitting framework data, and setting recursive data to null;

obtaining, on the client, the data stream;

identifying, on the client, the type identifier of the received data stream; and building, on the client, a proxy assembly having a type identified by the type identifier, wherein any properties of the data stream are built to the type, wherein fields are generated for any properties built to the type, wherein property data is populated to the fields, wherein local client methods are added to the type to provide real assembly functionality without the real assembly code.

9. The computer storage memory of claim 8, wherein generating a data stream further includes generating a data stream table that includes references to the type.

10. The computer storage memory of claim 9, wherein the type identifier of the obtained data stream includes generating the data stream table from the data stream and identifying the type from the generated data stream table.

11. The computer storage memory of claim 8, wherein the data stream is a secured mark-up language data stream.

12. The computer storage memory of claim 8, wherein building a proxy assembly further comprises identifying the type identifier as an unknown type and reconciling the unknown type prior to building the proxy assembly.

13. The computer storage memory of claim 8, wherein the local client method is generated on the client.

14. The computer storage memory of claim 13, wherein the local client method includes at least one member of a group comprising: a set method, a get method, and an initialize method.

15. A system for generating a proxy assembly according to metadata of a real assembly, the system comprising:
- a processor; and
- a memory having computer executable instructions stored thereon, wherein the computer executable instructions are configured for:
  - providing, on a server, a real assembly that includes real assembly code for causing real assembly functionality, wherein the real assembly includes a type identifier that indicates a type of real assembly and a method for causing the real assembly functionality;
  - parsing, on the server, the real assembly to identify the type identifier;
  - determining, on the server, that the type identifier is a proxy type by identifying the type identifier in a list of proxy types;
  - generating, on the server, reflection data related to the real assembly, wherein the reflection data includes any properties related to the real assembly, any attributes related to the real assembly, and any values related to the real assembly, wherein the reflection data does not include the method, wherein the reflection data does not include the real assembly code;
  - optimizing, on the server, the reflection data, wherein optimizing includes:
    - recording properties of the reflection data that include a same reference,
    - excluding references to a framework of the server when framework data exists on a client, and
    - identifying recursive data by identifying any of the properties of the real assembly listed more than twice within a sequence, wherein a value of any of the properties listed more than twice within the sequence is indicated with a null indicator;
  - generating, on the server, a data stream for the optimized reflection data, wherein generating the data stream includes writing the type identifier to the data stream, writing an identifier for the properties that include the same reference, omitting framework data, and setting recursive data to null;
  - obtaining, on the client, the data stream;
  - identifying, on the client, the type identifier of the received data stream; and
  - building, on the client, a proxy assembly having a type identified by the type identifier, wherein any properties of the data stream are built to the type, wherein fields are generated for any properties built to the type, wherein property data is populated to the fields, wherein local client methods are added to the type to provide real assembly functionality without the real assembly code.

16. The system of claim 15, wherein generating a data stream further includes generating a data stream table that includes references to the type.

17. The system of claim 16, wherein the type identifier of the obtained data stream includes generating the data stream table from the data stream and identifying the type from the generated data stream table.

18. The system of claim 15, wherein the data stream is a secured mark-up language data stream.

19. The system of claim 15, wherein building a proxy assembly further comprises identifying the type identifier as an unknown type and reconciling the unknown type prior to building the proxy assembly.

20. The system of claim 15, wherein the local client method is generated on the client device, wherein the local client method includes at least one member of a group comprising: a set method, a get method, and an initialize method.

* * * * *